United States Patent [19]

Tsai

[11] Patent Number: 5,709,513
[45] Date of Patent: Jan. 20, 1998

[54] MOUNTING STRUCTURE

[76] Inventor: Chun-Hsin Tsai, No. 38, Lane 49, Chien Fu Rd., Hsin Chuang City, Taipei Hsien, Taiwan

[21] Appl. No.: 677,195

[22] Filed: Jul. 9, 1996

[51] Int. Cl.⁶ .............................. F16B 39/00; F16B 43/02
[52] U.S. Cl. .................... 411/107; 411/34; 411/546; 411/999; 403/260
[58] Field of Search .......................... 411/34, 36, 37, 411/38, 55, 107, 546, 999, 105; 403/258, 260

[56] References Cited

U.S. PATENT DOCUMENTS

| | | | |
|---|---|---|---|
| 2,525,736 | 10/1950 | Taylor | 411/34 |
| 3,257,889 | 6/1966 | Fischer | 411/34 |
| 4,762,450 | 8/1988 | Schwind et al. | 411/34 |

FOREIGN PATENT DOCUMENTS 456004  11/1936  United Kingdom ................ 411/34

*Primary Examiner*—Neill R. Wilson
*Attorney, Agent, or Firm*—Donald C. Casey

[57] ABSTRACT

An improved mounting structure includes a soft mounting sleeve having a locking hole at a central position for fitting into a through hole of a mount, and a screw fitted with a washer. In assembly, the screw is inserted into the mounting sleeve fitted into the mount before driven into a frame structure. When the screw is driven into the top side of the mount, the bottom side of the mounting sleeve will elevate with the turning of the screw to impose a pressure on the screw threads, thus preventing the screw from being driven further and achieving a good mounting effect. This arrangement also prevents the screw from driving unduly deep into the frame structure due to excessive torsional force to prevent any possible damage to the frame structure or the screw threads.

1 Claim, 4 Drawing Sheets

MOUNTING STRUCTURE

BACKGROUND OF THE INVENTION (a) Field of the Invention

The present invention relates to a mounting structure, and more particularly to an improved mounting structure in which a screw and a mounting sleeve may be used to quickly and firmly fasten a mount onto a frame structure while preventing any possible damage to the frame structure or the screw threads due to excessive torsional force.

(b) Description of the Prior Art

FIG. 1 shows a conventional mounting structure. A screw A is passed through a through hole in a mount B and driven into a frame structure C to lock the mount B onto the frame structure C. A washer D is disposed below a screw head of the screw A to form a packing between the screw A and the mount B. However, in actual locking processes, screws are driven into frame structures by a torsional force. The size of the force will vary according to the mount. Although it is possible to use a torsional or electric screwdriver to control the force within a certain range, there may still be a phenomenon of insufficient torsion or excessive torsion. When the torsional force is insufficient, the mount cannot be firmly locked onto the frame structure. Conversely, when the torsional force is excessive, the screw will continue to drive into the frame structure although the mount is already locked firmly onto the frame structure. As shown in FIG. 2, the screw A has urged against a top surface of the mount B that is locked onto the surface of the frame structure C. If a torsional force is continuously applied onto the screw A, the screw A will continue to drive deeper into the frame structure C, bring the mount B to press against the frame structure C, which may result in damage of the screw threads. Worse still, the frame structure C may be damaged. Besides, a clearance cannot be maintained between the mount B and the frame structure C.

SUMMARY OF THE INVENTION

According to a first aspect of the present invention, the improved mounting structure essentially comprises a soft mounting sleeve having a locking hole at a central position and a screw fitted with a washer. In assembly, the screw is inserted into the mounting sleeve fitted into the mount before driven into a frame structure. When the screw is driven into the top side of the mount, the bottom side of the mounting sleeve will elevate with the turning of the screw to impose a pressure on the screw threads, thus preventing the screw from being driven further and achieving a good mounting effect. This arrangement also prevents the screw from driving unduly deep into the frame structure due to excessive torsional force to prevent any possible damage to the frame structure or the screw threads. Due to the washer's firm grip on the top side of the mount, the screw may be prevented from driving further deep into the frame structure. Such an arrangement also allows adjustment of the clearance between the mount and the frame structure to compensate for any uneven thickness or height of the mount.

According to a second aspect of the invention, the improved mounting structure a mounting sleeve may be fitted into a through hole of a mount in which a locking hole of the mounting sleeve may be quickly aligned with a through hole of the mount.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
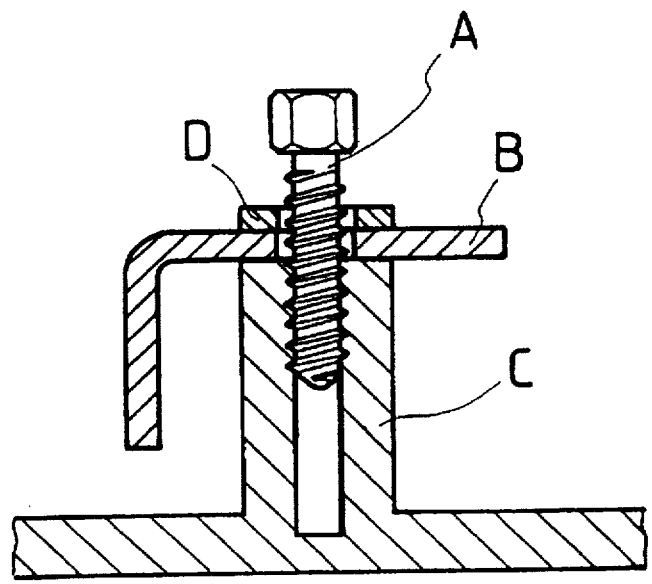
FIG. 1 is a schematic view of a conventional mounting structure.
Figure 2:
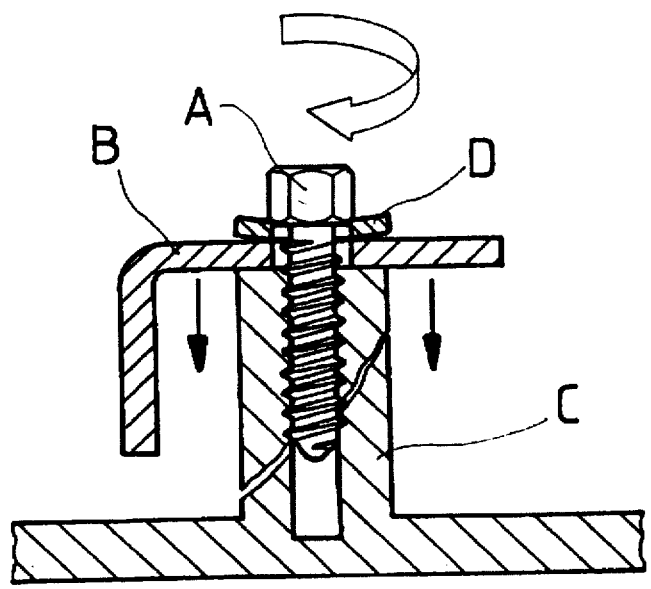
FIG. 2 is another schematic view of the conventional mounting structure.
Figure 3:
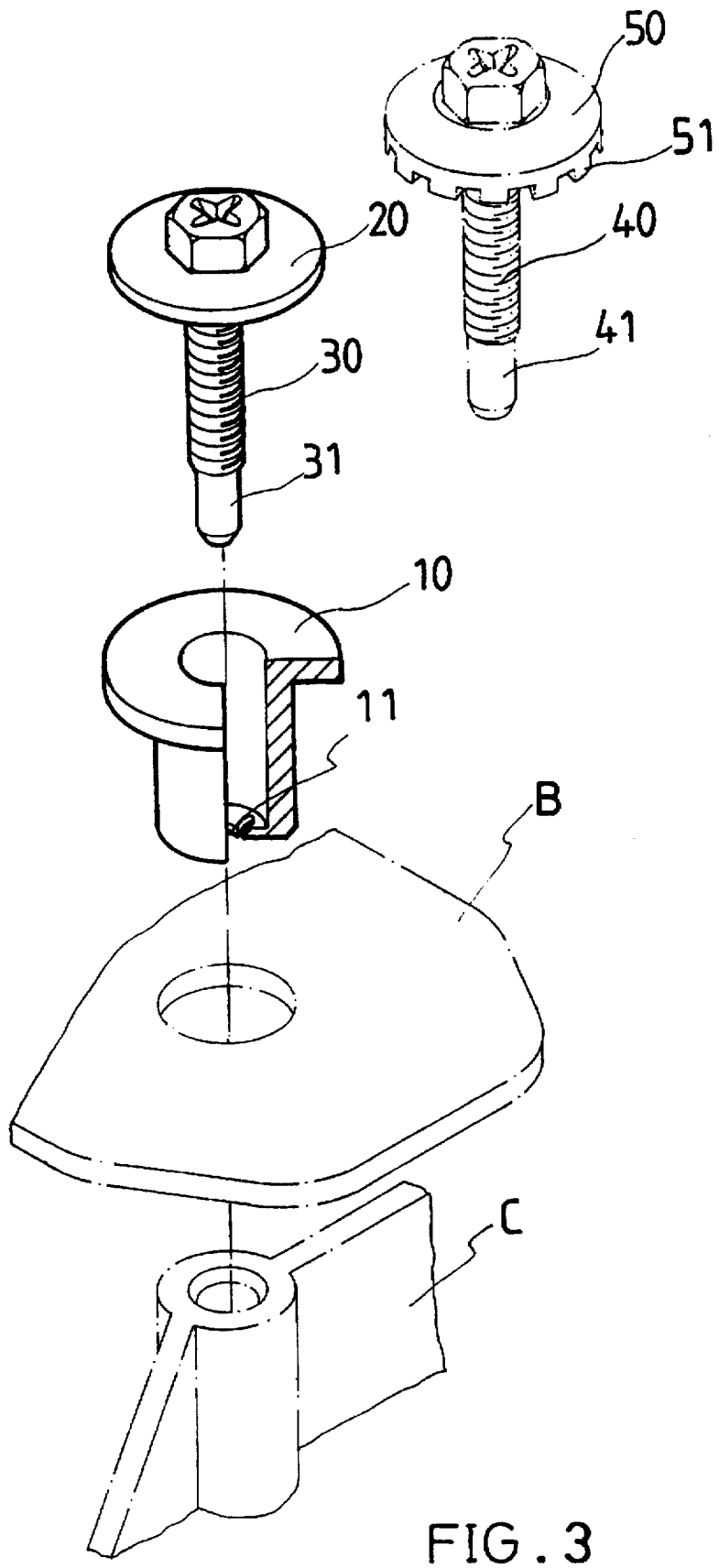
FIG. 3 is a schematic view of the improved mounting structure of the invention.

The improved mounting structure according to the present invention essentially comprises a mounting sleeve and a screw provided with a washer. The screw may be any ordinary metal or wooden screw; the washer may be any ordinary flat washer or one that has peripheral teeth at its bottom side. With reference to FIG. 3, a mounting sleeve 10 is a hollow soft structure having a locking hole 11 at a central position. The locking hole 11 is obliquely cut so that its inner ring forms a spiral shape so that a screw may be turnably driven into the locking hole 11 of the mounting sleeve 10. The screw may be a metal screw 30 or a wooden screw 40. The tip of the mechanical screw 30 or the wooden screw 40 extends to form an elongated guide portion 31 or 41. The washer may be a flat washer 20 or a washer 50 with a peripheral toothed portion 51 at its bottom side.

Figure 4B:
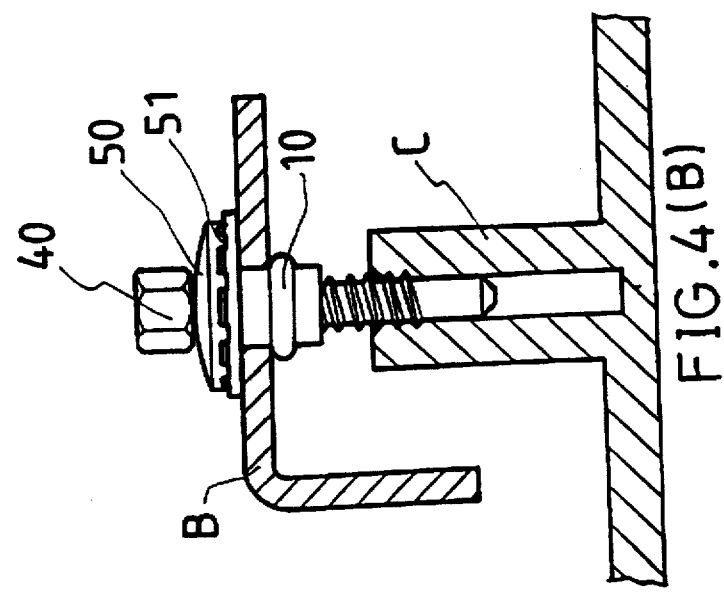
FIGS. 4A and 4B are respective schematic views illustrating assembly of the improved mounting structure of the invention.
Figure 4A:
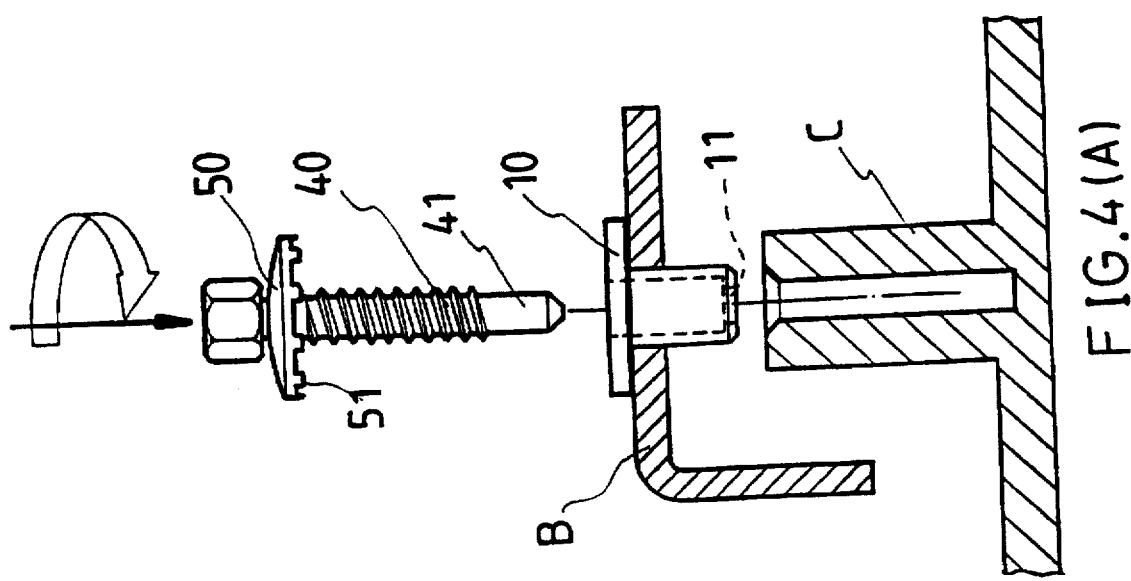

In actual operation, referring to FIG. 4A, the mounting sleeve 10 is inserted into a through hole of a mount B with its locking hole 11 orienting downwardly. The screw 40 is passed through the washer 50, the mount B, and the locking hole 11 of the mounting sleeve 10 in turn. By means of the guide portion 41, the screw 40 may be driven into a frame structure C in a substantially perpendicular fashion. With reference to FIG. 4B, when the screw 40 is locked into the top side of the mount B, the toothed portion 51 of the washer 50 will grip the top side of the mount B firmly, preventing the washer from slipping away with the turning of the screw 40. At the same time, the bottom side of the mounting sleeve 40 will slightly elevate with the turning of the screw 40 to imposed a pressure on the screw threads, preventing the screw 40 from being driven further, hence achieving a good mounting effect and stopping the screw 40 from driving unduly deep into the frame structure C due to excessive torsional force to damage the structural body C; possible damage to the screw threads may also be prevented.

Figure 5:
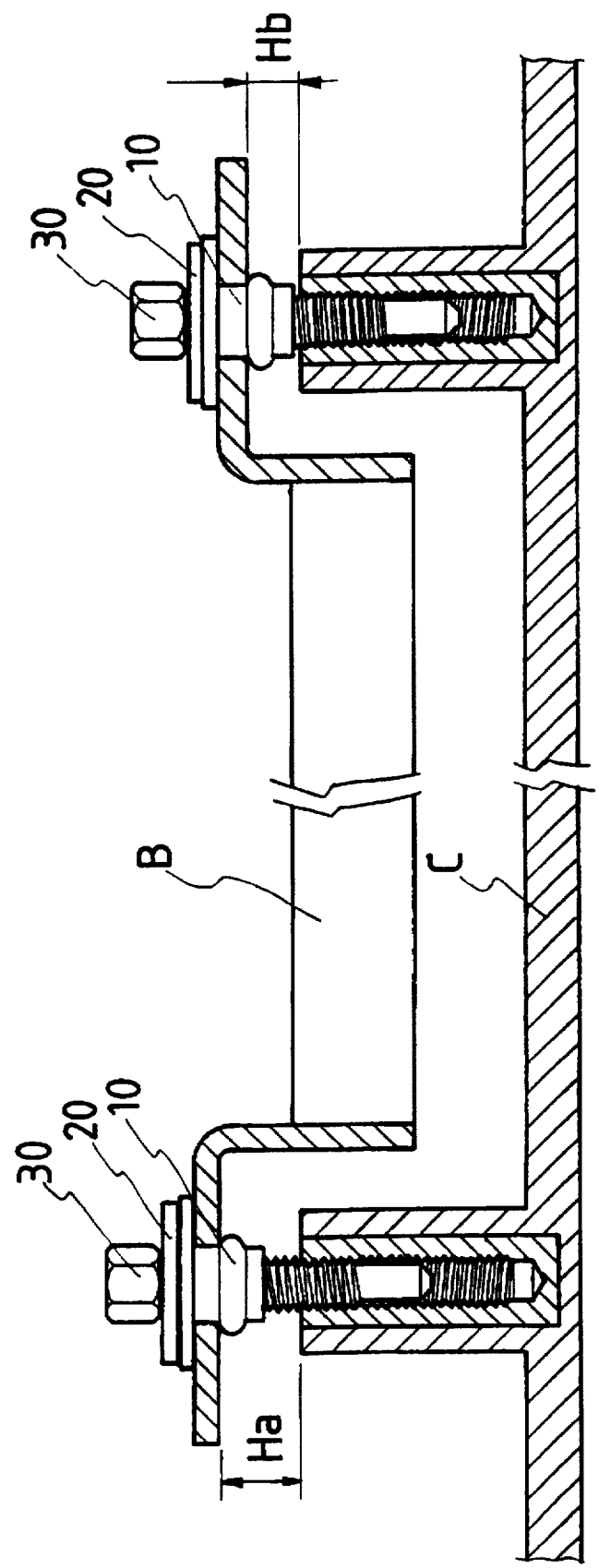
FIG. 5 is a schematic view showing the improved mounting structure in use.

In the present invention, the arrangement of the mounting sleeve 10 and the washer 20 not only prevents the screw 30 from driving further into the frame structure C but also helps adjust the clearance between the mount B and the frame structure C. Reference is now made to FIG. 5, showing the mechanical screw 30 and the flat washer 20. As the mount B itself may not have a uniform thickness or height owing to certain factors during processing, it may not be maintained at a certain level. In order to compensate for any difference in height, the mounting sleeve 10 may be fitted into the through hole of the mount B to keep it at a level position before driving the screw 30 into the locking hole 11. In other words, clearances Ha, Hb between the mount B and the frame structure C may be adjusted to compensate for any differences in height.

In summary, the mounting sleeve may be inserted into the through hole of the mount so that the locking hole of the mounting sleeve may be quickly aligned with the through hole of the mount. The mounting sleeve cooperates with the washer to firmly fasten the mount during assembly to prevent the screw from getting unduly deep into the frame structure body due to excessive torsional force, thus preventing possible damage to the frame structure or the screw threads. Besides, the clearance between the frame structure and the mount may be adjusted to compensate for any non-uniformity of the mount in height or thickness. Furthermore, the guide portion of the screw helps to quickly guide the screw into the frame structure.

Although the present invention has been illustrated and described with reference to the preferred embodiment thereof, it should be understood that it is in no way limited to the details of such embodiment but is capable of numerous modifications within the scope of the appended claims.

What is claimed is:

1. An improved mounting structure, comprising a first structure having a hole there through and a second structure having a corresponding, internally threaded bore therein, and means for joining said structure comprising a mounting sleeve slidably received in the hole through said first structure said mounting sleeve being deformable and having a locking hole at a central position, said locking hole being obliquely cut so that an inner ring thereof forms a spiral shape a screw received in said locking hole; said screw being provided with a washer at one end adjacent its head and an elongated tip at an opposite end forming a guide portion, said screw extending through said sleeve and into threaded engagement with the bore in said second structure, so that as said screw is tightened said sleeve will deform to form a buffer between said structures.

* * * * *